US012805437B2

(12) United States Patent
Bich et al.

(10) Patent No.: US 12,805,437 B2
(45) Date of Patent: Nov. 24, 2026

(54) AUTOMATIC ROW GUIDANCE NUDGE FOR AGRICULTURAL VEHICLES

(71) Applicant: CNH Industrial America LLC, New Holland, PA (US)

(72) Inventors: Seth Bich, Newmanstown, PA (US); Abhinav Tripathi, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 507 days.

(21) Appl. No.: 18/080,476

(22) Filed: Dec. 13, 2022

(65) Prior Publication Data

US 2024/0188494 A1 Jun. 13, 2024

(51) Int. Cl.
*A01D 41/127* (2006.01)

(52) U.S. Cl.
CPC ................................ *A01D 41/1278* (2013.01)

(58) Field of Classification Search
CPC ................................................ A01D 41/1278
See application file for complete search history.

(56) References Cited

U.S. PATENT DOCUMENTS 3,991,618 A 11/1976 Stampfer et al.
4,528,804 A * 7/1985 Williams ............. A01B 69/008 180/401
4,663,918 A * 5/1987 Williams ............. A01B 69/008 56/DIG. 15
5,307,611 A * 5/1994 Vardeman .......... A01D 41/1278 56/DIG. 15
5,509,486 A * 4/1996 Anderson .......... A01D 41/1278 172/6
5,585,626 A 12/1996 Beck et al.
8,359,141 B1 1/2013 Lange
8,725,361 B2 5/2014 Kellum
9,766,083 B2 9/2017 Peake et al.
10,080,321 B2 9/2018 Blackwell et al.
10,575,460 B2 3/2020 Davis et al.
10,721,859 B2 7/2020 Wu et al.
11,032,967 B2 6/2021 Connell et al.
11,284,556 B2 * 3/2022 Schleicher ........... A01B 69/008
11,363,754 B2 6/2022 Bertucci et al.

(Continued)

FOREIGN PATENT DOCUMENTS

CA 3009217 A1 * 12/2018 ............... B62D 1/28

OTHER PUBLICATIONS

Bergerman et al., "Robot Farmers: Autonomous Orchard Vehicles Help Tree Fruit Production," IEEE Robotics & Automation Magazine, Mar. 2015, 11 pages.

(Continued)

*Primary Examiner* — Russell Frejd
(74) *Attorney, Agent, or Firm* — Fletcher Yoder, P.C.

(57) ABSTRACT

Systems and methods are disclosed for aligning an agricultural vehicle, such as a harvester, with reference crop rows by implementing a nudge in the form of a change in a feedback signal from a sensing arrangement that detects relative distances from the reference crop rows. The nudge may be implemented as a voltage change in a variable voltage feedback signal from the sensing arrangement. The amount of nudge may be determined from an algorithm, a lookup table, or may be made in predetermined steps. The system may implement open loop (manual) or closed loop control of the nudges.

20 Claims, 4 Drawing Sheets

(56) References Cited

U.S. PATENT DOCUMENTS

| | | | | |
|---|---|---|---|---|
| 2018/0373259 | A1* | 12/2018 | Aberle | B62D 1/28 |
| 2019/0277636 | A1 | 9/2019 | Birnie | |
| 2022/0304228 | A1* | 9/2022 | Hunt | A01D 41/141 |
| 2022/0317688 | A1* | 10/2022 | Li | B60K 35/80 |
| 2024/0040946 | A1* | 2/2024 | Katti | A01D 41/1278 |

OTHER PUBLICATIONS

Geng et al., "Development and Testing of Automatic Row Alignment System for Corn Harvesters," Applied Sciences, Jun. 2022, 18 pages.

Winterhalter et al., "Localization for precision navigation in agricultural fields—Beyond crop row following," Journal of Field Robotics 38, No. 3, May 2021, 23 pages.

EP Search Report for EP Application No. 23216063.0, Mailed May 15, 2024, 8 Pages.

* cited by examiner

AUTOMATIC ROW GUIDANCE NUDGE FOR AGRICULTURAL VEHICLES

BACKGROUND

The present disclosure relates generally to systems and methods for nudging steering of agricultural vehicles.

Agricultural vehicles designed to harvest row crops pose unique issues with properly following rows in a field being harvested. In current technologies rows of the crops (e.g., stalks) may be detected, furrows in the field may be detected and used as a basis for guiding steering of the harvesting vehicles. In other systems, more complex sensing technologies such as GPS location can be used to identify locations that may be compared to a map of the field for such purposes. In one current technology, for example, a row guidance system guides to a calibrated row sensor voltage based on a center resting position of the sensor or its associated detection members. Due to the mounting location on the vehicle, guiding to this centered voltage is not always ideal for row tracking, such as on curves and hillsides.

There is a need, therefore, for improved approaches to row guidance in such applications.

SUMMARY

In certain embodiments, a system comprises a sensing arrangement that in operation senses alignment of an agricultural vehicle with two reference crop rows, the sensing arrangement outputting a reference alignment signal representative of relative closeness to the two reference crop rows. Processing circuitry receives and processes the reference alignment signal to regulate steering of the vehicle. For correction of alignment of the vehicle with the reference crop rows the processing circuitry implements a nudge by altering the reference alignment signal.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In general, the disclosure provides an improved and straightforward approach to adapting row crop steering guidance to accommodate changes required by actual field conditions. For example, the techniques implemented may utilize past row sensor data to apply an offset to the target voltage of the sensor improving row tracking during curve and hillside operation. This offset could be calculated based on sensor characterization data placed into a steering model. The disclosed techniques may be used in conjunction with existing technologies, such as the advanced farming system available under the commercial designation AFS from Case IH. Changes in steering, sometimes referred to herein as "nudges" may be implemented on the fly, and in control approaches that may be open loop (e.g., operator input or authorized) or closed loop (e.g., automatic without operator input).

Figure 1:
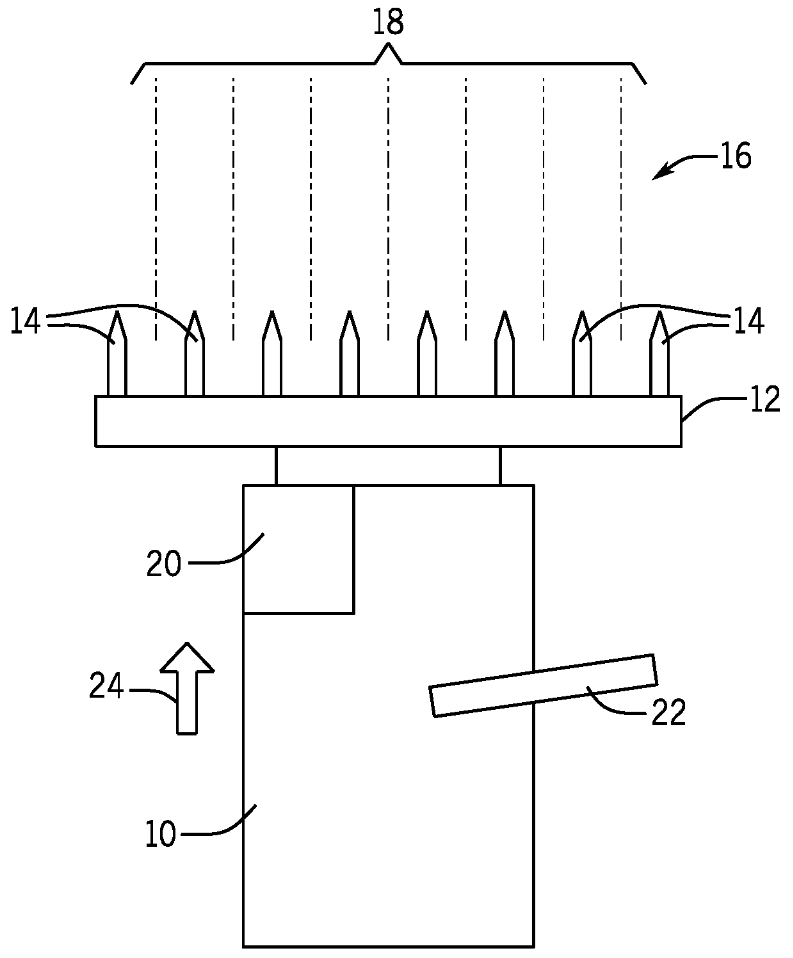
FIG. 1 is a diagrammatical representation of an exemplary row crop harvester according to the present disclosure.

Referring to the drawings, FIG. 1 is a diagrammatical representation of an exemplary row crop harvester according to the present disclosure. The illustration of FIG. 1 is of a row harvester 10, such as for harvesting corn. As will be appreciated by those skilled in the art, such vehicles may be adapted to receive a variety of headers 12, such as for harvesting different crops. In the case of the header 12 shown in FIG. 1, header snouts 14 extend in front of the vehicle and serve to grasp, cut, and convey stalks and grains into the harvester as it progresses through a field. The crop 16 will present, in such applications, rows 18 that are generally aligned with one another and that were defined during planting in a conventional manner. The vehicle is typically driven by a human operator occupying the vehicle cab 20. As discussed below, the operator will be provided in the cab with means for steering the vehicle, and with an interface to monitor and control its operation.

As the harvester progresses in the field, it will cut and partially process the harvested product, such as by at least partial removal of grain from the cut crop. The separated grain may be transferred from the vehicle by a spout 22 which may contain an auger or other transport mechanisms. In operation, a grain cart or other collection vehicle will typically track beside the harvester to receive the harvested grain from the spout 22. Progress through the field, as indicated by arrow 24 will follow the direction of the rows such that the individual plants in each row will properly align with the header snouts to ensure proper cutting and processing.

In a currently contemplated embodiment, crops in the rows are detected and feedback from such detection may be used to help guide the steering of the vehicle to ensure alignment with the rows. However, in certain field conditions, particularly in curves, turns, and on hillsides steady state errors may occur and build that could result in deviation from the desired path aligned with the rows. The disclosed techniques provide for real or near-real time correction of the steering with or without prior knowledge of the field and crop topologies.

Figure 2A:
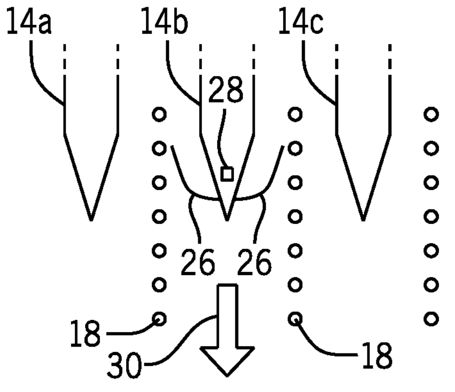
FIGS. 2A and 2B are diagrammatical views of portions of row harvesters illustrating scenarios in which the improved guidance techniques of the disclosure may be used.
Figure 2B:
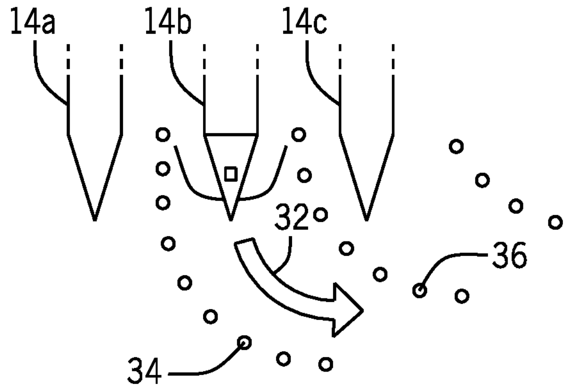

In particular, FIGS. 2A and 2B are diagrammatical views of portions of row harvesters illustrating scenarios in which the improved guidance techniques of the disclosure may be used. Sensing of the crops in the rows may be done by physical contact of wands 26 that protrude from one or more of the header snouts 14*a*, 14*b* and 14*c*, as shown in the figures, in this case from snout 14*b*. A sensor 28 is coupled to the wands and provides a feedback signal indicating relative closeness to the two rows between which the instrumented snout is passing. For example, in a contemplated embodiment, a potentiometer may produce a known voltage when the wands are "centered", such as 2.5 volts. This center voltage may be calibrated to ensure that when "centered" (i.e., not contacting crop on either side), a known voltage signal is output.

In operation, and as discussed more fully below, the sensor feedback, in some cases in combination with other data, such as past steering data, position system data (e.g., GPS data) may be used to steer the vehicle to ensure proper alignment with the crop rows. When progressing in a straight segment of a field, as indicated by arrow 30, this control may satisfactorily control steering in a closed loop manner with little correction needed. In other segments of the field, such as in curves or turns, however, as shown in FIG. 2B, the vehicle must progress in a curvilinear path as indicated by arrow 32. Moreover, there can be no assurance that this path will have a uniform radius of curvature, and proper steering may require slight adjustments, which may comprise one or more nudges in one direction or another, or a series of nudges to properly follow the row alignment. The crops of the curving rows, indicated by reference numerals 34 and 36 may, then contact the crops differently depending upon the relative misalignment of the header snouts with the rows. This differential contact will result in deviation of the output of the sensor from the appropriate or "centered" output. Vehicle steering may be altered, then, with a goal to drive this output back to the desired centered output, either in a closed loop manner or through steering inputs by the operator.

Figure 3A:
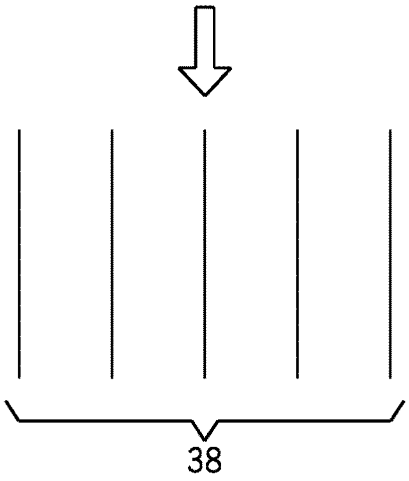
FIGS. 3A-3C are diagrammatical views three scenarios in which the disclosed improvements may be advantageous.
Figure 3B:
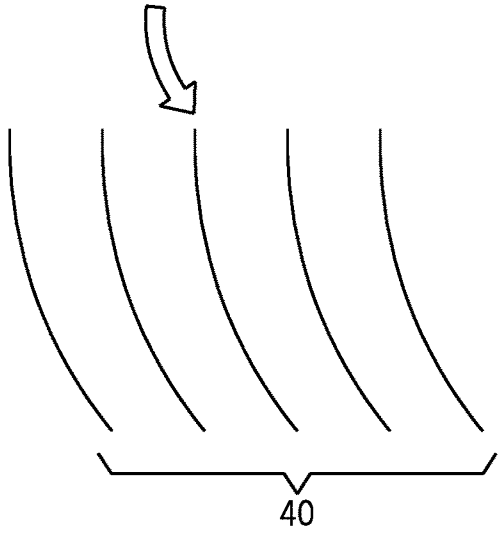
Figure 3C:
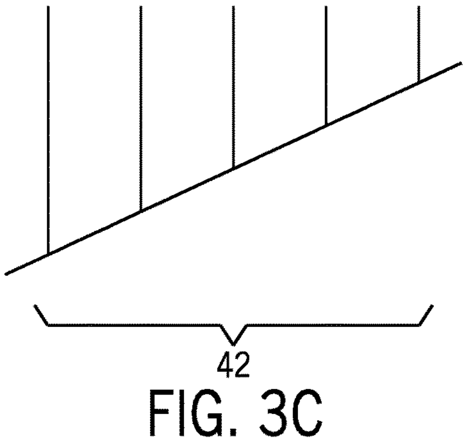

But it has been found that such techniques may not produce sufficient correction of steering, particularly in curves, turns, and on hillsides. The disclosed approach allows for correction or adjustments of the desired setpoint of the row detection sensor to accommodate errors in guidance through the rows. An advantage of the technique is that it may be implemented as a supplement or complement to existing steering guidance approaches in enhance and improve their performance. FIGS. 3A-3C are diagrammatical views three scenarios in which the disclosed improvements may be advantageous. As mentioned above, scenario 38 may correspond to a straight section of a field, where crop rows are aligned in straight lines. Scenario 40 corresponds to curved sections or turns where radii of curvature may be constant or changing. These will typically follow and lead other straight sections, so that the guidance should be highly adaptable either in open or closed loop control. Scenario 42 of FIG. 3C occurs with crops are planted on an incline or hill. In such situations, the vehicle will need to follow the rows along the hill, that is, traverse to the direction of incline. Because the vehicle may have a tendency to slide or creep slightly downhill, steering corrections may be required. In the case of the wand and sensor detection discussed above, for example, contact may be more frequent with the downhill side of the header snout, and this can be corrected for by nudging the steering in the uphill direction.

Figure 4:
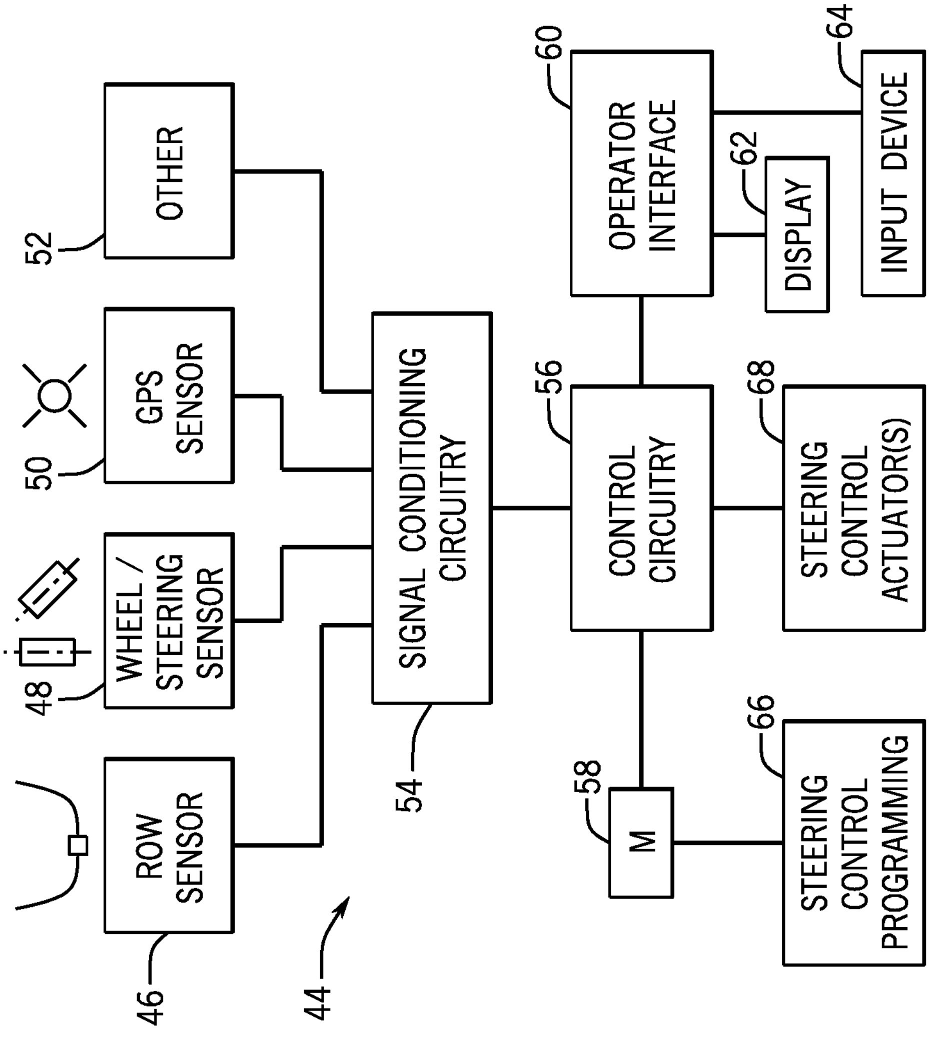
FIG. 4 is a block diagram of exemplary functional components of a system for nudging steering guidance of a row harvester.

FIG. 4 is a block diagram of exemplary functional components of a system for nudging steering guidance of a row harvester. The steering nudge system 44 comprises sensor inputs on which steering corrections may be based. In the illustrated embodiment, these include one or more row sensors 46 of the type described above. Wheel position or steering sensors 48 may provide signals representative of the current steering positions (e.g., angles) of steered wheels of the vehicle. Outside position sensors, such as GPS position inputs 50 may be provided that can help in situating the vehicle in a field, and in monitoring tracking as movement of the vehicle proceeds. Other sensors 52 may also be present and used as inputs, such as cameras, terrain detection sensors, and so forth.

The sensor inputs may be applied to any suitable signal conditioning circuitry 54 that may that may perform signal conversion, scaling, and any other desired operations. The conditioned and/or processed signals are then applied to signal processing or control circuitry 56, which may comprise, for example, digital processors, on-board computers, and so forth. In some embodiments, the control circuitry is part of the vehicle control circuitry, or a subsystem of such circuitry. Memory circuitry 58 is provided which may store parameters such as settings, scaling factors, data related to vehicle steering dynamics, field maps, and so forth, but also any programming used for determining desired steering guidance based on the inputs mentioned above, as indicated generally by reference numeral 66.

It is contemplated that the system may allow for delivery of numerical, graphical, auditory, or some other indication to the vehicle operator related to the current steering conditions and settings, recommended nudges, automatically implemented nudges, and so forth. One or more interfaces 60 will be provided for this purpose. As will be appreciated by those skilled in the art, where desired simple numerical indications may be displayed that indicate steering settings and nudges current or recommended. In addition or instead, graphical displays may indicate the same type of information or even a more or less detailed depiction of the vehicle in the field, with past, present, and upcoming steering indicated graphically, along with any recommended or automatically implemented nudges. Where desired auditory or other alarms may provide the operator with indications of recommended changes in steering (e.g., nudges), for example.

It is also contemplated that the system may allow for open loop operation, where the vehicle operator is prompted or recommended to change or nudge the steering guidance. Where desired, semi or fully automated (e.g., closed loop) operation may be implemented wherein the control circuitry itself implements nudges based on detected signals, such as to more appropriately align the vehicle with upcoming crop rows, particularly in curves, turns and hillside scenarios. Such automated control may be notified to the operator on the interface. Moreover, the operator will have one or more input devices 64 that allow for changes in steering. These may include a steering wheel, but also devices (e.g., a touch screen) in which nudges (i.e., incremental changes or adjustments in sensor settings) may be selected. When recommendations are provided to the operator via the interface, such as for nudges that may be needed to more closely follow crop rows, these may be displayed on the display, and the operator may authorize them as desired (e.g., accept or reject). When operator inputs including the nudges are made, these are communicated to the control circuitry which then implements them for controlling one or more steering actuators 68, such as hydraulic cylinders or other mechanical controls that regulate positions of steered wheels.

While various approaches may be adopted to implement nudges in the steering control, in a currently contemplated embodiment offsets are made to the feedback signal from the row detection sensor or sensors. As noted above, an exemplary crop detection arrangement utilizes wands that physically contact the crops in the rows used to regulate steering. The sensed signal may be a voltage that indicates proper "centering" of the detection device or devices between reference rows. In such cases, this voltage may already be corrected to account for any calibration of the sensor or any other aspect of the detection apparatus. To implement nudges, then, this signal is augmented or reduced further by an amount based on the desired nudge, which may be in any relation to the desired change, such as proportional, linear, or non-linear. By way of example, in a case where the nominal output of the sensor is 2.5 volts, but a calibration has made the appropriate "centered" or correct alignment output 2.73 volts, a nudge may be input to move this value to 3.65 volts. That is, the nudge will effectively bias the "correct" or centered alignment to one side of the two reference rows. This straightforward nudge adjustment may then be used as the basis for upcoming steering control (within a desired control horizon, or until changed again). In open loop, or manual control, nudge "steps" (e.g., +/−a fraction of a volt in the example) may be employed where the operator may, for example, press a location on the display to increment (or reduce) the nudge in a desired direction. In closed loop operation, similar steps may be employed, or a stored look-up-table may serve to correlate the amount of correction or nudge of the sensor signal with detected variation desired in the steering. Such tables may also take into account other sensor inputs of the type mentioned above. Moreover, various steering algorithms may be used that allow for changes in the sensor feedback as a basis for the desired nudge. In some systems, the "aggressivity" of steering changes (e.g., corresponding to one or more gains in the system control) may be altered as well, particularly where the field conditions are changing more rapidly as compared to the vehicle speed. All such control changes may be made in ways and at rates to more closely follow the reference rows, to avoid understeer and oversteer, as well as any instability in steering changes.

Figure 5:
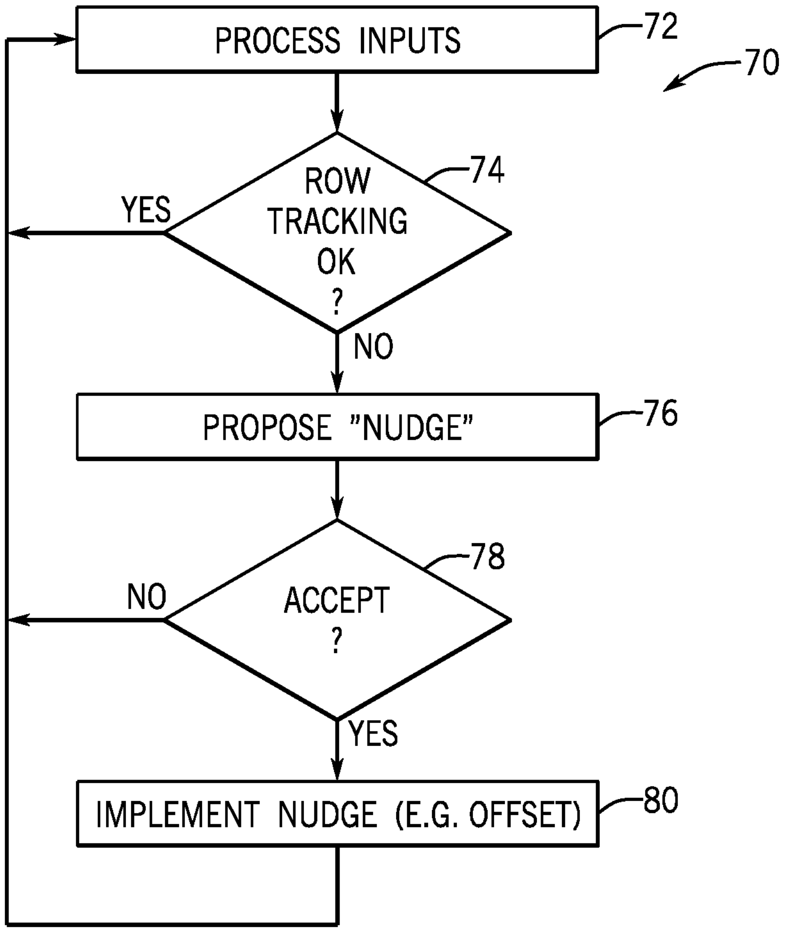
FIGS. 5 and 6 are diagrams of an exemplary processes for implementing nudged steering guidance in accordance with the disclosure.
Figure 6:
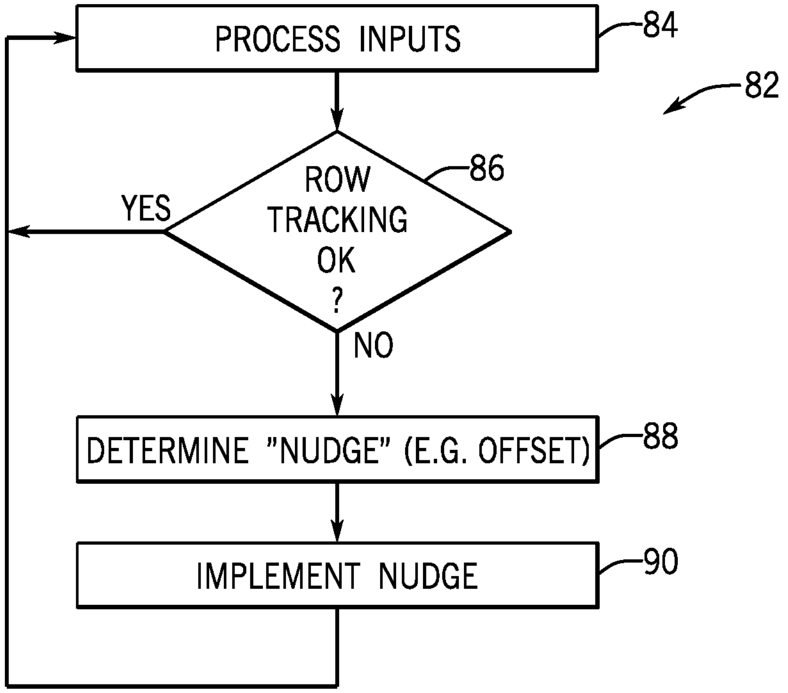

FIGS. 5 and 6 are diagrams of an exemplary processes for implementing nudged steering guidance in accordance with the disclosure. The process 70 illustrated in FIG. 5 is intended as an open loop implementation where the operator inputs nudges or authorizes recommended nudges. The process begins with acquiring and processing inputs as indicated by operation 72. At operation 74, the system then determines whether the current steering settings are appropriate for following the crop rows, and if so, continues to monitor the sensor inputs. When a correction is determined to be warranted a nudge may be recommended to the operator at operation 76, and the operator may accept or rejection (or ignore) the recommendation at operation 78. If accepted, the nudge is implemented, such as by altering the sensed row sensing system feedback signal. Of course, where operator initiated nudges are provided for, these may be input and implemented in place of operations 76 through 80.

The closed loop process 82 of FIG. 6 similarly begins with acquiring and processing the available inputs at operation 84. As in the previous case, then, the existing steering control routine determines whether the current steering settings are appropriate or whether a nudge would be helpful to more closely follow the crop rows, as indicated by operation 86. If a nudge is desired, at operation 88 the process may determine the desired nudge, and then at operation 90, implement the nudge, again by changing the sensor or reference signal used for steering control. This process may be based on a lookup table as discussed above, or an algorithm, or may also simply proceed in a stepwise manner through incremental nudge changes to find the proper steering to follow the crop rows. It should be noted, as well, that various hybrid schemes may be envisaged, such as approaches that allow for switching between open loop (manual) control, and automatic control, and back, approaches that allow for override of nudges (e.g., by the operator), and so forth.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:

a sensing arrangement that in operation senses alignment of an agricultural vehicle with two reference crop rows, the sensing arrangement outputting a reference alignment signal representative of relative closeness to the two reference crop rows; and processing circuitry that receives and processes the reference alignment signal to regulate steering of the agricultural vehicle;

wherein for correction of alignment of the agricultural vehicle with the two reference crop rows in a curve, a turn, a hillside, or a combination thereof, the processing circuitry implements a nudge by altering the reference alignment signal based on an amount of the nudge to enhance alignment of the agricultural vehicle with the two reference crop rows.

2. The system of claim 1, wherein the processing circuitry automatically determines and implements the nudge without operator intervention.

3. The system of claim 2, wherein the amount of the nudge is determined by reference to a lookup table relating relative current or anticipated misalignment of the agricultural vehicle with the reference crop rows.

4. The system of claim 1, wherein the nudge is implemented in a stepwise manner based on predetermined alterations in the reference alignment signal.

5. The system of claim 1, comprising an operator interface configured to receive operator input of the nudge.

6. The system of claim 5, wherein the processing circuitry is configured to generate and display a recommended nudge that may be accepted by the operator via an operator interface.

7. The system of claim 1, wherein the sensing arrangement contacts crops in the two reference crop rows and produces a variable voltage output signal corresponding to the reference alignment signal based upon relative contact with the two reference crop rows.

8. The system of claim 7, wherein the nudge comprises an adjustment that increases or decreases the voltage output signal.

9. The system of claim 1, wherein the agricultural vehicle comprises a combine harvester, and wherein the sensing arrangement is provided in a header snout of the combine harvester.

10. A system comprising:

a sensing arrangement that in operation senses alignment of an agricultural vehicle by contact with two reference crop rows, the sensing arrangement outputting a voltage reference alignment signal representative of relative closeness to the two reference crop rows; and processing circuitry that receives and processes the voltage reference alignment signal to regulate steering of the agricultural vehicle;

wherein for correction of alignment of the agricultural vehicle with the two reference crop rows in a curve, a turn, a hillside, or a combination thereof, the processing circuitry implements a nudge by altering a voltage of the voltage reference alignment signal based on an amount of the nudge to enhance alignment of the agricultural vehicle with the two reference crop rows.

11. The system of claim 10, wherein the processing circuitry automatically determines and implements the nudge without operator intervention.

12. The system of claim 11, wherein the amount of the nudge is determined by reference to a lookup table relating relative current or anticipated misalignment of the agricultural vehicle with the reference crop rows.

13. The system of claim 10, wherein the nudge is implemented in a stepwise manner based on predetermined voltage alterations in the voltage reference alignment signal.

14. The system of claim 10, comprising an operator interface configured to receive operator input of the nudge.

15. The system of claim 14, wherein the processing circuitry is configured to generate and display a recommended nudge that may be accepted by the operator via the operator interface.

16. The system of claim 10, wherein the agricultural vehicle comprises a combine harvester, and wherein the sensing arrangement is provided in a header snout of the combine harvester.

17. A method comprising:

sensing, via a sensing arrangement, alignment of an agricultural vehicle with two reference crop rows, and outputting a reference alignment signal representative of relative closeness to the two reference crop rows;

receiving and processing, via processing circuitry, the reference alignment signal to regulate steering of the agricultural vehicle; and correcting the alignment of the agricultural vehicle with the two reference crop rows in a curve, a turn, a hillside, or a combination thereof, by implementing, via the processing circuitry, a nudge by altering the reference alignment signal based on an amount of the nudge to enhance the alignment of the agricultural vehicle with the two reference crop rows.

18. The method of claim 17, wherein the sensing arrangement contacts crops in the two reference crop rows and produces a variable voltage output signal corresponding to the reference alignment signal based upon relative contact with the two reference crop rows, and wherein the nudge comprises an adjustment that increases or decreases the voltage output signal.

19. The method of claim 17, wherein the processing circuitry automatically determines and implements the nudge without operator intervention.

20. The method of claim 17, wherein the processing circuitry is configured to generate and display a recommended nudge that may be accepted by an operator via an operator interface.

* * * * *